No. 741,603. PATENTED OCT. 13, 1903.
H. H. WILSON.
DOUGH MIXING APPARATUS.
APPLICATION FILED APR. 23, 1903.
NO MODEL. 2 SHEETS—SHEET 1.
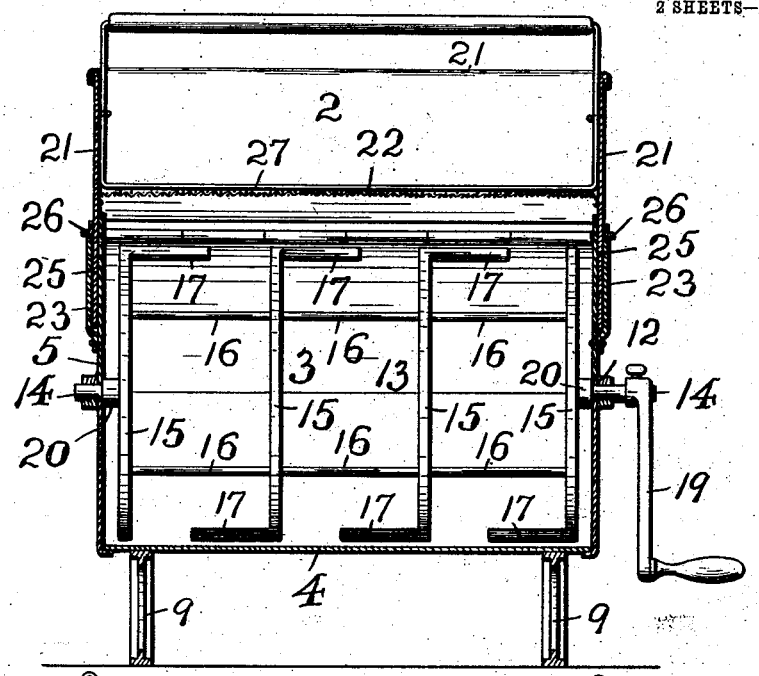
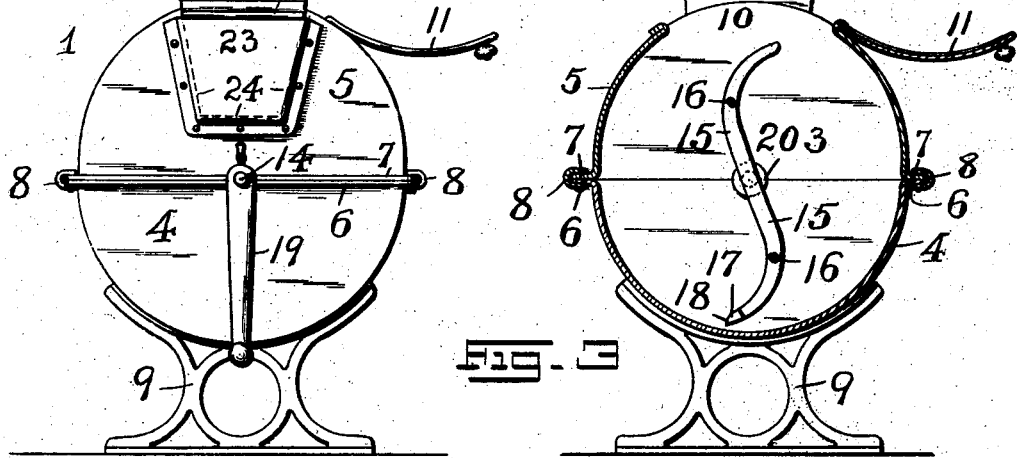
WITNESSES: Geo. D. Richards, M. B. Fraentzel
INVENTOR: Harry H. Wilson,
BY Fred L. C. Fraentzel,
ATTORNEY

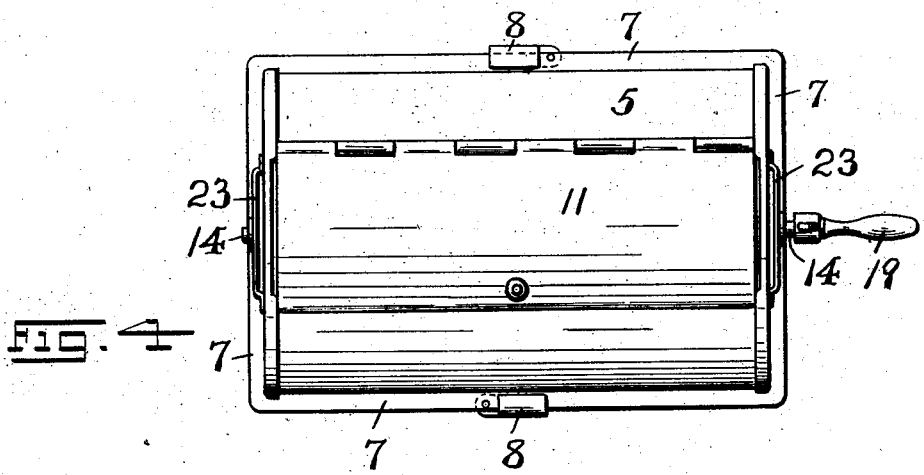
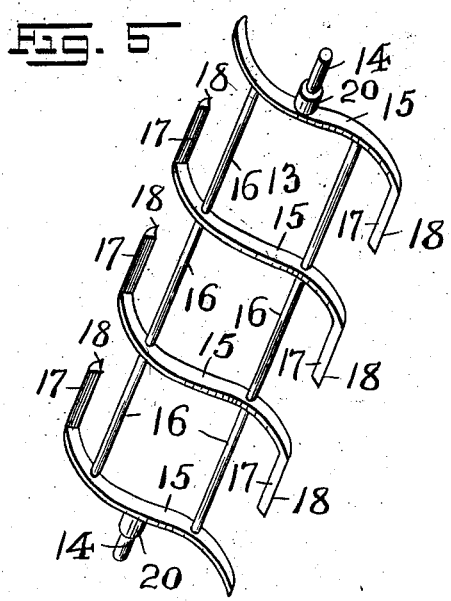
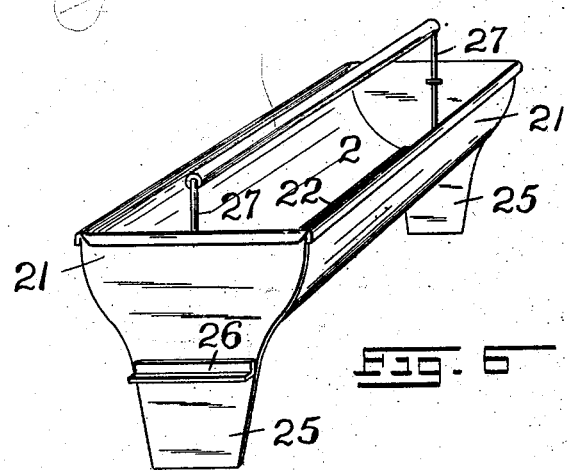

No. 741,603.

Patented October 13, 1903.

UNITED STATES PATENT OFFICE.

HARRY H. WILSON, OF NEWARK, NEW JERSEY.

DOUGH-MIXING APPARATUS.

SPECIFICATION forming part of Letters Patent No. 741,603, dated October 13, 1903.

Application filed April 23, 1903. Serial No. 153,931. (No model.)

*To all whom it may concern:*

Be it known that I, HARRY H. WILSON, a citizen of the United States, residing at Newark, in the county of Essex and State of New Jersey, have invented certain new and useful Improvements in Dough-Mixing Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in apparatus for the mixing of dough; and my present invention has for its principal objects the production of a novel construction of dough-mixing apparatus which may also be used as a raising device, all with a view of providing a simply-constructed apparatus of the character hereinafter more fully set forth and which is preferably provided with a detachably-arranged flour-holding compartment, from which the flour is sifted into the water, yeast, and other ingredients contained in the dough-mixing compartment of the apparatus, as required for mixing a proper dough for bread, pie, biscuit, and other dough.

A further object of this invention is to provide a dough-mixing apparatus in which the central shaft or spindle provided with the usual agitator or mixing-arms is dispensed with, thereby obviating the objectionable bunching or twisting of the dough during the mixing or kneading operation about the central shaft, as is at present the case with machines of this character now in general use and whereby the dough is not properly mixed, and, furthermore, a large bunch or coil of dough thereby becoming located or entwined upon the main central axle or shaft greater power has to be exerted to manipulate the apparatus or machine than with the apparatus or machine having an agitator or kneading device made according to the principles of my present invention and as hereinafter more fully set forth.

To avoid these objectionable features is one of the principal purposes of the present invention; and with these various objects in view this invention consists in the general arrangements and combinations of the devices and their parts as well as in the details of the construction thereof, all of which will be hereinafter more fully described, and then finally embodied in the clauses of the claim.

My invention is clearly illustrated in the accompanying drawings, in which—

Figure 1 is a central longitudinal vertical section of the apparatus embodying the principles of this invention. Fig. 2 is an end view of the same, and Fig. 3 is a transverse vertical section of the apparatus. Fig. 4 is a top or plan of the main body of the apparatus or dough-mixing device with the flour holding and sifting compartment removed. Fig. 5 is a perspective view of the agitator made according to the principles of this invention, and Fig. 6 is a perspective view of the flour-sifter.

Similar characters of reference are employed in all of the said herein-above described views to indicate corresponding parts.

In the said drawings the reference character 1 indicates the complete apparatus for the mixing and kneading of dough and also for the purpose of raising the dough, the same comprising a lower mixing-compartment 3 and an upper flour-containing compartment 2. This lower mixing-compartment consists, essentially, of a pair of separable shells or members 4 and 5, adapted to be fitted upon each other on their marginal flanges 6 and 7, as clearly illustrated in the various figures of the drawings, and then locked or held in place by means of suitably-disposed and suitably-constructed clamping or locking devices, as 8. These devices are preferably pivotally attached to the flange 6 of the lower shell or member 4, having their clamping or holding members made to embrace both the flanges 6 and 7 of the respective shells or members 4 and 5. The said lower shell 4 is preferably of a semicylindrical cross-section, but the upper shell 5 is preferably of a semi-elongated cross-section—that is, the curved surface of the said shell or member 4 is concentric with the longitudinal central axis of the apparatus; but the curved surface of the upper shell or member 5 is preferably eccentric with the said longitudinal central axis of the apparatus, substantially as illustrated and for the purpose to be hereinafter more particularly specified. It will be understood, however, that I do not limit myself to these shapes and forms of the said sections or members 4 and 5 and that the said members may be of any other suitable and desirable cross-section.

The lower member or shell 4 is provided with suitable standards 9, while the upper shell or casing 5 is made with an opening 10, which can be closed by a lid or door 11, as shown, during the rising process of the dough when the sifting-compartment 2 has been removed. The said shells or members 4 and 5 are provided in their ends with suitably-arranged semicircular openings 12, forming suitable bearings in which are rotatably arranged the journals 14 of an agitator 13. This agitator is made, preferably, as illustrated in the drawings, and it consists of a pair of end arms 15, each of which is provided with a journal 14, as shown, and between the said end arms is an arrangement of other arms 15, any suitable number of such arms being employed, according to the size of the mixing-chamber. To dispense with the objectionable central shaft or spindle used with the dough-mixing apparatus now in general use, these arms are connected with laterally-extending connecting arms or bars 16, substantially in the manner illustrated in Figs. 1, 3, and 5 of the drawings. Each arm 15 is also preferably provided at its free end with a laterally-extending finger 17. These fingers 17 are made with comparatively sharp cutting edges 18 for suitably cutting and spreading the dough, and while passing through the dough they lift the same in the manner of a person mixing dough by hand. When the agitator 13 is arranged in the bearings formed by the said semicylindrical openings 12, a crank-arm 19 or other suitable actuating device is secured to one of the journals 14 for rotating the said agitator within the mixing-chamber 3 when the two sections or members 4 and 5 have been placed upon each other and have been locked and secured in this relation by means of the previously-described holding or locking catches 8. That there may be no lateral movement of the agitator 13 within the mixing-chamber when in position the journals are provided with collars or shoulders 20, as shown.

Referring now to Fig. 1 of the drawings it will be seen that owing to the large open space between the laterally-extending connecting arms or bars 16 the possibility of the dough becoming bunched or entwined in a solid mass in the central portion of the mixing-chamber and there simply turning about a central shaft or spindle, and hence not being properly mixed or kneaded, is entirely overcome, the said arms or bars 16 at the same time acting for the same purpose as the laterally-extending fingers 17 to more thoroughly mix or knead the dough. As will be seen from an inspection of Fig. 3 of the drawings, the fingers 17 rotate in close proximity to the interior surfaces of the shells or members 4 and 5 except at the upper interior part of the shell or member 5, which is preferably of the elongated cross-section herein-above mentioned, so that the said fingers 17 will not pass in such close proximity to the inner upper surface of the mixing-compartment 3, whereby the sticking of the dough to the upper surface of the said compartment, and especially to the hinged door, is entirely obviated.

The previously-mentioned flour holding and sifting compartment 2 consists, essentially, of a semicylindrical or other suitable trough-shaped shell or member 21, provided with a sieve or screen-covered lower portion 22, which is arranged above the opening 10 of the mixing-compartment 3 in such a manner that a free passage for the air between the said shell or member 21 and the upper shell or member 5 of the mixing-compartment is provided. To obtain this open space for the free circulation and passage of the air into the mixing-compartment, the said upper shell or member 5 has secured at its ends suitable receiving members 23, forming pockets, said pockets having the downwardly-tapering edges 24, as indicated in Fig. 2, into which are fitted correspondingly-formed legs 25 on the said shell or member 21. These legs 25 are usually provided with suitable supports, as 26, which rest upon the upper marginal edges of said receiving members 23 and help to retain the sifting device in its proper position above the mixing-compartment, as will be clearly understood from an inspection of Figs. 1 and 2 of the drawings. Within the said sifting-compartment is arranged a suitable agitator, as 27, for the purpose of stirring up the flour in said compartment 2 and forcing it through the screen or sieve 22 into the mixing-compartment 3 while the agitator-arms 15 in said compartment 3 are being operated by the turning of the crank 19. The said agitator 27 in the compartment 2 may be of any suitable construction, but is preferably that described in my previous Letters Patent, numbered 719,070 and granted to me on January 27, 1903, and need not, therefore, be described in detail in the present specification.

The manner of using the apparatus is the same as that set forth in the specification of my said previous Letters Patent No. 719,070 and will not be further described here.

After the dough has been properly mixed the sifting attachment can be removed and the lid or door 11 closed down over the opening 10, after which the device is ready for raising purposes.

It will be obvious that changes may be made in the various arrangements of the devices and their parts, as well as in the details of the construction thereof, without departing from the scope of my present invention. Hence I do not limit this invention to the exact arrangements and combinations of the devices and their parts as described in the previous specification and as illustrated in the accompanying drawings, nor do I confine myself to the exact details of the construction of the said parts.

Having thus described my invention, what I claim is—

1. In a dough-mixing apparatus, a casing provided with bearings, and an agitator in said casing comprising diametrically-disposed arms, connecting-bars between said arms near the free end portions thereof to provide an unobstructed space in the center of said casing, and laterally-extending fingers at the free ends of said arms, substantially as and for the purposes set forth.

2. In a dough-mixing apparatus, a casing provided with bearings, an agitator in said casing comprising diametrically-disposed arms 15, journals 14 connected with the two end arms 15, said journals being arranged in said bearings, connecting-bars 16 between said arms 15 near the free end portions thereof to provide an unobstructed space in the center of the casing, and laterally-extending fingers 17 on said arms 15 having cutting edges, substantially as and for the purposes set forth.

3. In a dough-mixing apparatus, a mixing-compartment comprising a pair of separably connected shells, one of said shells having a semicircular cross-section and the other shell having a semi-elongated cross-section, and an agitator rotatably arranged in said compartment, comprising diametrically-disposed arms, connecting-bars between said arms near the free end portions thereof to provide an unobstructed space in the center of said casing, and laterally-extending fingers at the free ends of said arms, substantially as and for the purposes set forth.

4. An apparatus for mixing dough comprising a mixing-compartment consisting of a pair of separably-connected shells, one of said shells having an opening and a hinged lid for closing said opening, a mixing-agitator in said mixing-compartment, and a receiving member at each end of said shell, and a sieve-provided flour-holding compartment having legs removably arranged in said receiving members, substantially as and for the purposes set forth.

5. An apparatus for mixing dough comprising a mixing-compartment consisting of a pair of separably-connected shells, one of said shells having an opening and a hinged lid for closing said opening, a mixing-agitator in said mixing-compartment, and a receiving member at each end of said shell, a sieve-provided flour-holding compartment having legs removably arranged in said receiving members, and supports on said legs resting upon the marginal edge portions of said receiving members, substantially as and for the purposes set forth.

In testimony that I claim the invention set forth above I have hereunto set my hand this 22d day of April, 1903.

HARRY H. WILSON.

Witnesses:
FREDK. C. FRAENTZEL,
GEO. D. RICHARDS.